United States Patent Office 3,708,439
Patented Jan. 2, 1973

3,708,439
POLYBENZIMIDAZOLES
Adnan A. R. Sayigh, North Haven, Benjamin W. Tucker, Bethany, and Henri Ulrich, Northford, Conn., assignors to The Upjohn Company, Kalamazoo, Mich.
No Drawing. Filed Sept. 28, 1971, Ser. No. 184,621
Int. Cl. C08g 33/02
U.S. Cl. 260—2 R     4 Claims

ABSTRACT OF THE DISCLOSURE

Polybenzimidazoles are described which are characterized by the recurring unit:

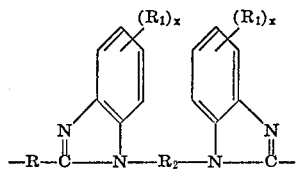

wherein R=arylene ($C_{6-12}$), alkylene ($C_{1-12}$), cycloalkylene ($C_{5-8}$),

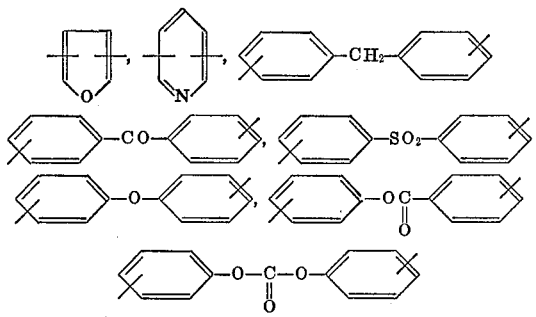

$R_1$=lower-alkyl, lower-alkoxy, halogen; $x$=0–3 and $R_2$=arylene ($C_{6-12}$),

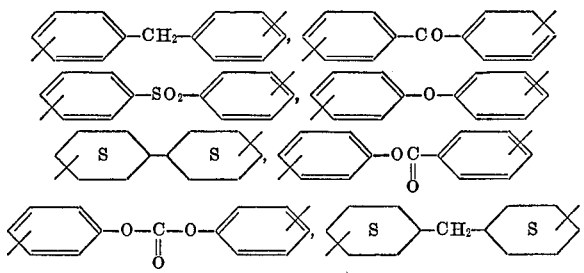

The polybenzimidazoles possess markedly high thermal stability as compared with previously known compounds of this class which have H atoms attached to ring nitrogen. They also possess lower glass transition and melt temperatures than previously known polybenzimidazoles and, accordingly, possess the advantage that they can be fabricated using conventional molding techniques.

BACKGROUND OF THE INVENTION

(1) Field of the invention

This invention relates to novel polymers having heterocyclic groups in the recurring unit thereof and is more particularly concerned with novel polybenzimidazoles and with processes for their preparation.

(2) Description of the prior art

Polybenzimidazoles have been widely described in the recent polymer literature; see, for example Encyclopedia of Polymer Science and Technology, vol. 11, pages 188 to 228. All representatives of this type of polymer hitherto reported have had a recurring unit in which the benzimidazole ring has been linked to adjacent moieties in the chain via C atoms in the benzimidazole. Illustratively, the structure of the recurring unit in a simple polybenzimidazole derived from 3,3'-diaminobenzidine and isophthalic acid is as follows:

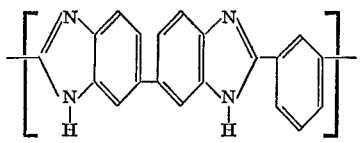

In the above structure one of the two N atoms in each imidazole ring contains free hydrogen and none of the N atoms is directly involved in the linkage of the benzimidazole to the neighboring moieties in the polymer chain.

Polybenzimidazoles having the above structure, but having the hydrogen atoms on the N atoms replaced by phenyl, have been described (ibid, page 214) but the resulting compounds were reported as too thermoplastic to be useful.

We have now found that a new class of polybenzimidazoles can be prepared in which the imidazole rings are attached to neighboring moieties in the polymer chain via one of the nitrogen atoms in said imidazole rings and the nitrogen atoms in said ring do not carry free hydrogen atoms. The properties of this new class of polymers have marked advantages in certain crucial respects compared with the polybenzimidazoles previously known.

SUMMARY OF THE INVENTION

This invention comprises polybenzimidazoles characterized in that the recurring unit thereof is of the following formula:

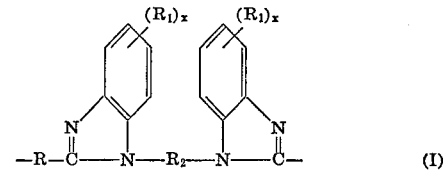     (I)

wherein R is a divalent moiety selected from the group consisting of arylene from 6 to 12 carbon atoms, inclusive, alkylene from 1 to 12 carbon atoms, inclusive, cycloalkylene from 5 to 8 carbon atoms, inclusive,

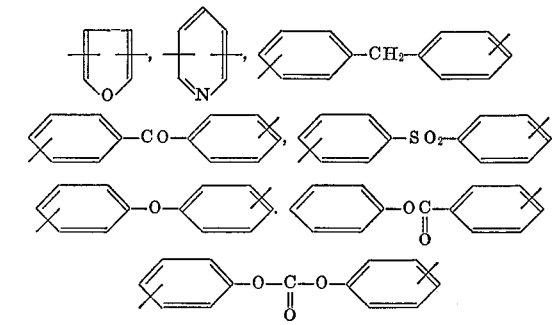

$R_1$ is selected from the class consisting of lower-alkyl, lower-alkoxy, and halo, $x$ is an integer from 0 to 3, and $R_2$ is a divalent moiety selected from the group consisting of arylene from 6 to 12 carbon atoms, inclusive,

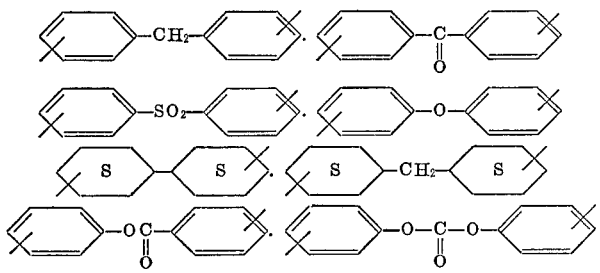

The term "arylene from 6 to 12 carbon atoms, inclusive" means the divalent radical obtained by removing a hydrogen atom from each of two nuclear carbon atoms in an aromatic hydrocarbon having the stated carbon atom content. Illustrative of said arylene is phenylene, tolylene (i.e. dimethylphenylene), naphthylene, diphenylene and the like.

The term "alkylene from 1 to 12 carbon atoms, inclusive" has its generally accepted meaning and is inclusive of methylene, ethylene, propylene, butylene, hexylene, octylene, nonylene, decylene, dodecylene and isomeric forms thereof.

The term "cycloalkylene from 5 to 8 carbon atoms, inclusive" means the divalent radical obtained by removing two hydrogen atoms from the same or different ring carbon atoms in a cycloalkane having the stated carbon atom content. Said cycloalkylene is inclusive of cyclopentylene, cyclohexylene, cycloheptylene, cyclooctylene and isomeric forms therof.

The term "lower-alkyl" means alkyl from 1 to 6 carbon atoms, inclusive, such as methyl, ethyl, propyl, butyl, pentyl, hexyl, and isomeric forms thereof.

The term "lower-alkoxy" means aloxy from 1 to 6 carbon atoms, inclusive, such as methoxy, ethoxy, propoxy, butoxy, pentyloxy, hexyloxy and isomeric forms thereof.

The term "halo" means fluoro, chloro, bromo, and iodo. The letter "S" in the rings of the moieties

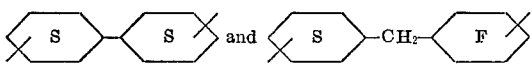

indicates that these rings are fully saturated.

The polybenzimidazoles of the invention having the recurring unit (I) are useful for all the various purposes for which known polybenzimidazoles are used; see Encyclopedia of Polymer Technology, supra. The polybenzimidazoles of the invention are additionally useful in that they possess increased thermal stability and have glass transition temperatures and melt temperatures sufficiently low to enable them to be fabricated by injection molding techniques.

DETAILED DESCRIPTION OF THE INVENTION

The polybenzimidazoles of the invention having the recurring unit (I) can be prepared from the appropriate tetramine having the formula:

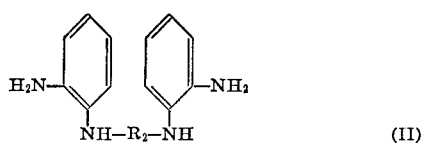

wherein $R_2$ has the significance hereinbefore defined, and the appropriate derivative of the corresponding dicarboxylic acid having the formula:

$$\text{HOOC—R—COOH} \qquad (III)$$

wherein R is as hereinbefore defined. Any of the known techniques for carrying out the condensation can be employed; see, Encyclopedia of Polymer Technology, supra.

For example, the condensation can be achieved by heating the reactants together in the presence of an organic solvent, such as phenol, m-cresol and the like having a boiling point sufficiently high (of the order of 200° C. or higher) to permit the condensation to take place. Alternatively, the condensation can be carried out in polyphosphoric acid. The preferred method is that known as melt condensation in which a mixture of the starting materials is heated until melting occurs and thereafter heating is continued until the desired viscosity of the polymer is achieved.

In the case of the aliphatic dicarboxylic acids (III; R=alkylene or cycloalkylene) the free dicarboxylic acids can be employed in any of the above-described techniques but the aromatic dicarboxylic acids are generally not employed in the free carboxylic acid form because of their tendency to decarboxylate at the temperatures employed in the condensation. Preferably the dicarboxylic acids (III) are employed in the melt condensation in the form of an ester such as a lower-alkyl or aryl ester. Most preferably, the dicarboxylic acids (III) are employed in the melt condensation in the form of their diphenyl esters. In the latter instance, phenol is eliminated during the condensation leading to the formation of the polybenzimidazole and said phenol is readily removed from the final reaction product by distillation.

The melt condensation is advantageously carried out at temperatures within the range of about 200° C. to about 400° C. The condensation is continued until the desired degree of polymerization has occurred. This latter can be determined using various techniques. For example, the increase in viscosity of the reaction mixture can be monitored as a rough guide to degree of polymerization or aliquots can be removed periodically from the reaction mixture for determination of molecular weight. Molecular weights within the range of about 5,000 to about 50,000 can be achieved in this manner in the polymers of the invention.

The novel polybenzimidazoles (I) obtained by any of the above methods can be purified, if desired, by extraction with appropriate solvents to remove any unchanged starting materials and the like. As mentioned previously, in the melt polymerization technique in which the diphenyl ester of the dicarboxylic acid (III) is employed, the liberated phenol can be removed from the reaction mixture by distillation in vacuo. The polybenzimidazoles (I) can be further purified by conventional techniques such as reprecipitation from an appropriate mixture of solvents. For example, the polymers can be dissolved in solvents such as chloroform, tetrahydrofuran, N,N-dimethylformamide, and the like and can be precipitated from the solutions so obtained by addition of solvents such as benzene, toluene, xylene, petroleum ether and the like.

The novel polybenzimidazoles (I) of the invention are, for the most part, solids which are characterized by remarkable thermal stability even when heated in the presence of oxygen and by their relatively low glass transition and melt temperatures. The latter permit the polybenzimidazoles (I) to be molded using conventional molding techniques into any desired shape, e.g. in the form of bushings, seal faces, electrical insulators, compressor vanes, impellers, pistons and piston rings, gears, thread guides, cams, brake linings, clutch faces, abrasive articles and the like. This is in marked contrast to polybenzimidazoles hitherto known in the art which were characterized by relative infusibility which meant that molding could only be accomplished by sintering or hot pressing technology. Additionally, because of their solubility in solvents such as chloroform, tetrahydrofuran, dimethylformamide and the like, the novel polybenzimidazoles of the invention can be employed as coating compositions for wire coating and in the casting or spraying of polymer films on a wide variety of substances such as metal, ceramic, fabrics, polymerics and the like. The polybenzimidazoles (I) can also be drawn or spun as fibers or extruded as filaments.

The tetramines of Formula II above, which are employed as starting materials in the preparation of the polybenzimidazoles (I), are themselves novel compounds. They can be prepared readily using the following reaction sequence:

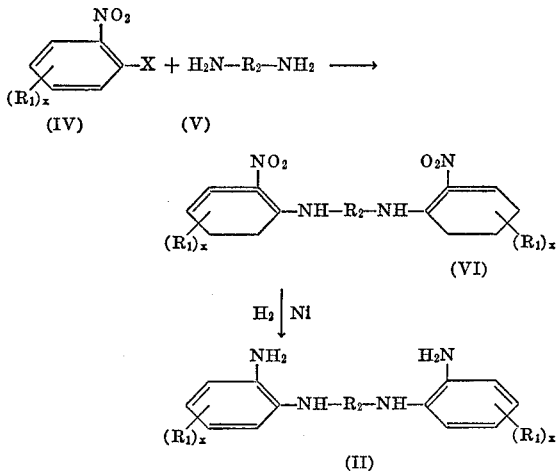

wherein $R_1$, $R_2$, and $x$ are as hereinbefore defined and X represents halogen, preferably chlorine or fluorine.

The first step of the above reaction, namely the condensation of the nitro compound (IV) and the diamine (V) is accomplished using the conditions known in the art for the phenylation of aromatic amines. Illustratively, the nitro compound (IV) and the diamine (V) are brought together in substantially stoichiometric proportions in the presence of water and an alkaline earth metal oxide such as magnesium oxide. The reaction mixture is then heated in a sealed vessel at temperatures of the order of about 150° C. to about 250° C. until the desired condensation is complete. The latter point can be determined by removal and analysis of aliquots of the reaction mixture at periodic intervals. The desired nitroamine (VI) is isolated from the reaction mixture by conventional techniques. For example, the reaction product can be extracted with water to remove magnesium salts and the crude nitroamine (VI) can be further purified, if desired, by recrystallization.

The nitroamine (VI) is then reduced to the tetramine (II) by techniques conventional in the art for the reduction of aromatic nitro compounds. For example, said nitroamine (VI) can be reduced using hydrogen in the presence of Raney nickel.

The nitro compounds (IV) and the diamines (V) employed in the above synthesis are known compounds and are, for the most part, readily available commercially. Similarly, the dicarboxylic acids (III) and the various derivatives thereof, which are employed as starting materials in the preparation of the novel polybenzimidazoles (I) are known compounds and relatively readily available.

The following examples describe the manner and process of making and using the invention and set forth the best mode contemplated by the inventors of carrying out the invention but are not to be construed as limiting.

EXAMPLE 1

N,N'-di(2-aminophenyl)-di-(4-aminophenyl)methane (1) A mixture of 11.88 g. (0.06 mole) of di(4-aminophenyl)methane, 21.2 g. (0.15 mole) of o-fluoronitrobenzene, 8 g. (0.2 mole) of magnesium oxide and 60 ml. of water was placed in a Hoke cylinder. The cylinder was sealed and heated in an oil bath at 240 to 250° C. for 10 hours. At the end of this time the cylinder was cooled and the reaction mixture was removed therefrom and washed in methanol. The resulting mixture was filtered and the red solid (33.25 g.) so isolated was extracted twice with 150 ml. portions of boiling acetonitrile. The hot extracts were filtered hot and the filtrates were cooled in ice. The resulting crystalline solid which separated was isolated by filtration and dried. There was thus obtained 13.65 g. (51.7 percent theoretical yield) of N,N'-di-(2-nitrophenyl)-di-(4-aminophenyl)methane in the form of a crystalline solid having a melting point of 155 to 156° C.

*Analysis.*—Calcd. for $C_{25}H_{20}N_4O_4$ (percent): C, 68.18; H, 4.55; N, 12.73. Found (percent): C, 68.14; H, 4.76; N, 12.87.

(2) A mixture of 8.8 g. (0.02 mole) of N,N'-di(2-nitrophenyl) - di - (4-aminophenyl)methane, prepared as described above, and 200 ml. of ethyl acetate was placed in a 500 ml. high pressure bottle and 1 g. of Raney nickel (methanol washed) in suspension in 50 ml. of ethyl acetate was added. The resulting mixture was hydrogenated in a Parr shaker until the theoretical amount of hydrogen had been absorbed. The catalyst was then removed from the reaction mixture by filtration and the filtrate was evaporated to dryness. The residue was recrystallized from isopropyl alcohol. There was thus obtained 5.4 g. (71 percent theoretical yield) of N,N'-di(2-aminophenyl)-di(4-aminophenyl)methane in the form of a crystalline solid having a melting point of 139 to 141° C.

*Analysis.*—Calcd. for $C_{25}H_{24}N_4$ (percent): C, 78.95; H, 6.32; N, 17.74. Found (percent): C, 79.04; H, 6.50; N, 14.47.

EXAMPLE 2

N,N'-di(2-aminophenyl)-4,4'-diaminodiphenyl (1) A mixture of 8 g. (0.2 mole) of magnesium oxide, 11.04 g. (0.06 mole) of benzidine, 21.2 g. (0.15 mole) of o-fluoronitrobenzene and 60 ml. of water was placed in a Hoke cylinder. The cylinder was sealed and heated in an oil bath at 220° C. to 240° C. for 8 hours. The resulting mixture was cooled, removed from the cylinder and heated to reflux with 300 ml. of methanol. The mixture was filtered while hot. The filtrate was cooled in ice and the solid which separated was isolated by filtration to give 6 g. of crystalline material. The undissolved residue removed from the methanol extraction by filtration weighed 34.4 g. and was extracted successively with hot ethylene dichloride,, hot chloroform and finally with hot o-dichlorobenzene and a total of 19.56 g. of crystalline material was recovered from the various hot extracts. There was thus obtained a total of 25.56 g. (50 percent theoretical yield) of N,N'-di(2-nitrophenyl)-4,4'-diaminodiphenyl in the form of a crystalline solid having a melting point of 247 to 249° C.

(2) The N,N'-di(2-nitrophenyl)-4,4'-diaminodiphenyl so obtained was then hydrogenated using the procedure described in Example 1, part (2) above to obtain N,N'-di(2-aminophenyl)-4,4'-diaminodiphenyl in the form of a crystalline solid having a melting point of 209 to 210° C. in 88.2 percent theoretical yield.

*Analysis.*—Calcd. for $C_{24}H_{22}N_4$ (percent): C, 78.70; H, 6.01; N, 15.30. Found (percent): C, 78.24; H, 5.94; N, 15.03.

EXAMPLE 3

N,N'-di(2-aminophenyl)-4,4'-diaminodiphenylether (1) A mixture of 8 g. (0.2 mole) of magnesium oxide, 12 g. (0.06 mole) of 4,4'-diaminodiphenylether, 21.2 g. (0.15 mole) of 2- fluoronitrobenzene and 60 ml. of water was placed in a Hoke cylinder. The cylinder was sealed and heated in an oil bath at about 240° C. for 10 hours. The resulting mixture was cooled, removed from the cylinder and heated to reflux with 300 ml. of ethyl acetate and filtered hot. The filtrate was cooled in ice and the crystalline material which separated was isolated by filtration. The filtrate was then used to make several more hot extractions of the reaction product whereby there was obtained a total of 16.05 g. (60.6 percent theoretical yield) of N,N'-di(2-nitrophenyl)-4,4'-diaminodiphenyl ether in the form of a crystalline solid having a melting point of 173 to 175° C.

*Analysis.*—Calcd. for $C_{24}H_{18}N_4O_5$ (percent): N, 12.67. Found (percent): N, 12.34.

(2) The N,N'-di(2-nitrophenyl)-4,4'-diaminodiphenyl-ether so obtained was then hydrogenated using the procedure described in Example 1, part (2) above to obtain N,N'-di(2-aminophenyl)-4,4'-diaminodiphenylether in the form of a crystalline solid having a melting point of 161 to 162° C. (after recrystallization from ethyl acetate).

EXAMPLE 4

Using the procedure described in Example 1, parts (1) and (2), but replacing the o-fluoronitrobenzene employed in part (1) by 2-fluoro-4-methyl-1-nitrobenzene, there is obtained N,N' - di(2-amino-5-methylphenyl)-di(4-aminophenyl)methane.

Similarly, using the procedure described in Example 1, parts (1) and (2), but replacing the o-fluoronitrobenzene by 2-fluoro-4-methoxy-1-nitrobenzene or 2,4-difluoro-1-nitrobenzene there are obtained N,N'-di(2-amino-5-methoxyphenyl)-di(4-aminophenyl)methane and N,N'-di(2-amino - 5 - fluorophenyl)-di(4-aminophenyl)methane, respectively.

EXAMPLE 5

Using the procedure described in Example 1, parts (1) and (2), but replacing the di(4-aminophenyl)methane employed in part (1) by p-phenylene diamine, there is obtained N,N'-di(2-aminophenyl)-1,4-phenylene diamine.

Similarly, using the procedure described in Example 1, parts (1) and (2), but replacing the di(4-aminophenyl) methane employed in part (1) by 4,4'-diaminobenzophenone, di(4-aminophenyl)sulfone, di(4-aminocyclohexyl) methane or 4,4'-diaminodicyclohexyl there are obtained N,N' - di(2-aminophenyl)-4,4'-diaminobenzophenone, N,N'-di(2-aminophenyl)-di(4-aminophenyl)sulfone, N,N'-di(2 - aminophenyl)-di(4-aminocyclohexyl)methane, and N,N' - di(2 - aminophenyl)-4,4'-diaminodicyclohexyl, respectively.

EXAMPLE 6

A polybenzimidazole was prepared as follows:

A mixture of 1.83 g. (0.005 mole) of N,N'-di(2-aminophenyl)-4,4'-diaminodiphenyl and 1.49 g. (0.005 mole) of diphenyl isophthalate was melted under nitrogen and heated with stirring to a temperature of 300° C. over a period of 1.5 hours. When the temperature reached 300° C., the reaction vessel was evacuated to a pressure of 0.005 mm. of mercury, and the mixture was maintained at 315 to 360° C. under vacuum for approximately 5 hours. There was thus obtained 1.75 g. of a polybenzimidazole having a molecular weight of approximately 5000 determined by gel permeation chromatography, a melting point of 290 to 310° C., and characterized by a recurring unit of the following structure:

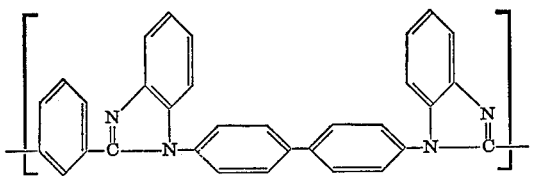

A weight loss of 5 percent was observed at 600° C. using htermal gravimetric analysis in air. The thermal gravimetric analysis was carried out using the following procedure. A 20 to 40 mg. sample of the polymer was suspended from a Cahn R. G. Electrobalance in a small electrical wire coil furnace. The balance was connected to a strip chart recorder. The furnace temperatures were controlled by the voltage applied to the furnace heater. The furnace temperature was raised from room temperature to approximately 1000° C. in 7 minutes, and sample weight losses were automatically recorded on the strip chart.

EXAMPLE 7

A polybenzimidazole was prepared as follows:

A mixture of 1.91 g. (0.005 mole) of N,N'-di(2-aminophenyl)-4,4'-diaminodiphenyl ether and 1.49 g. (0.005 mole) of diphenyl isophthalate was melted under nitrogen and heated with stirring to a temperature of 270° C. over a period of 3.5 hours. At the end of this time the mixture was allowed to cool to approximately 150° C. and the vessel was evacuated to a pressure of 0.005 mm. of mercury. This vacuum was maintained while the mixture was heated at 250° C. to 300° C. for approximately 5.5 hours. The product was allowed to cool to room temperature. There was thus obtained 1.65 g. of a polybenzimidazole having a molecular weight of approximately 5000 determined by gel permeation chromatography, a melting point of 250° C. to 260° C., and characterized by a recurring unit of the following structure:

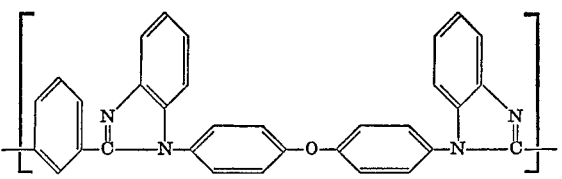

A weight loss of 5 percent was observed at 570° C. by thermal gravimetric analysis in air using the procedure described in Example 6.

EXAMPLE 8

A polybenzimidazole was prepared as follows:

A mixture of 1.9 g. (0.005 mole) of N,N'-di(2-aminophenyl)-di(4-aminophenyl)methane and 1.49 g. (0.005 mole) of diphenyl isophthalate was melted under nitrogen and heated with stirring to a temperature of 200° C. over a period of 4 hours. At this point the mixture was allowed to cool to room temperature (circa 25° C.) and was left overnight. The mixture was then heated under vacuum (0.005 mm. of mercury) at 300 to 360° C. for 5 hours. At the end of this time the reaction product was allowed to cool to room temperature. There was thus obtained 1.2 g. of a polybenzimidazole having a molecular weight of approximately 5000 determined by gel permeation chromatography, a melting point of 260 to 275° C. and being characterized by a recurring unit of the following structure:

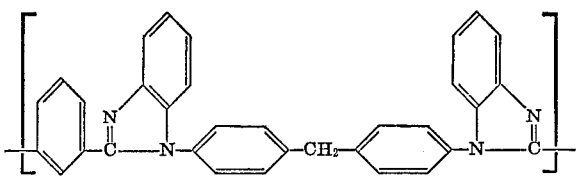

A weight loss of 5 percent was observed at 570° C. using thermal gravimetric analysis in air using the procedure described in Example 6.

EXAMPLE 9

Using the procedure described in Example 8, but replacing N,N'-di(2-aminophenyl)-di(4-aminophenyl)methane by an equivalent amount of N,N'-di(2-aminophenyl)-p-phenylene diamine, there is obtained a polybenzimidazole having a recurring unit of the following structure:

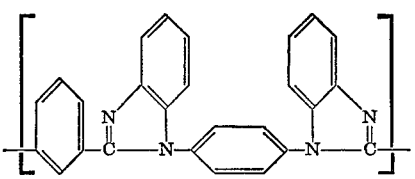

Similarly, using the procedure described in Example 8, but replacing N,N'-di(2-aminophenyl)-di(4-aminophenyl)methane by an equivalent amount of N,N'-di(2-amino-5-methylphenyl)-di(4-aminophenyl)methane,
N,N,'-di(2-amino-5-methoxyphenyl)-di(4-aminophenyl)methane,
N,N'-di(2-amino-5-fluorophenyl)-di(4-aminophenyl)methane,
N,N'-di(2-aminophenyl)-4,4'-diaminobenzophenone,
N,N'-di(2-aminophenyl)-di(4-aminophenyl)sulfone,
N,N'-di(2-aminophenyl)-di(4-aminocyclohexyl)methane, or
N,N'-di(2-aminophenyl)-4,4'-diaminodicyclohexyl, there are obtained the corresponding polybenzimidazoles of the invention.

EXAMPLE 10

Using the procedure described in Example 6 but replacing diphenyl isophthalate by an equivalent amount of diphenyl diphenyl-4,4'-dicarboxylate, there is obtained a polybenzimidazole having a recurring unit of the formula:

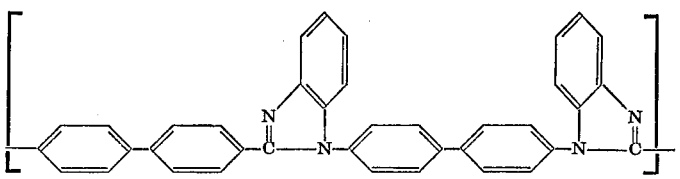

Similarly, using the procedure described in Example 6 but replacing diphenyl isophthalate by an equivalent amount of diphenyl pyridine-2,5-dicarboxylate,
diphenyl diphenylmethane-4,4'-dicarboxylate,
diphenyl benzophenone-4,4'-dicarboxylate,
diphenyl diphenylsulfone-4,4'-dicarboxylate,
diphenyl diphenylether-4,4'-dicarboxylate,
diphenyl diphenylcarbonate-4,4'-dicarboxylate,
diphenyl succinate,
diphenyl glutarate,
diphenyl azelate,
diphenyl adipate, and diphenyl ester of p-terephthaloyloxybenzoic acid, there are obtained the corresponding polybenzimidazoles of the invention.

We claim:

1. A polybenzimidazole characterized in that the recurring unit thereof is of the following formula:

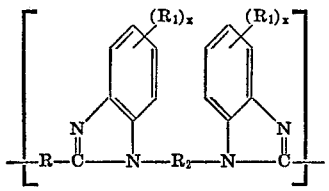

wherein R is a divalent moiety selected from the group consisting of arylene from 6 to 12 carbon atoms, inclusive, alkylene from 1 to 12 carbon atoms, inclusive, cycloalkylene from 5 to 8 carbon atoms, inclusive,

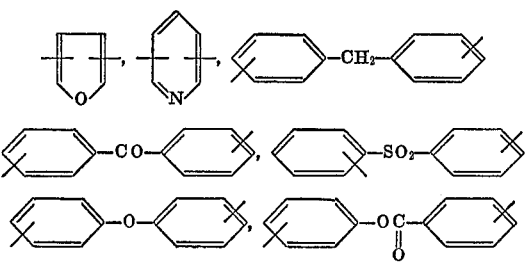

and

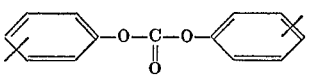

$R_1$ is selected from the class consisting of lower-alkyl, lower-alkoxy, and halo, $x$ is an integer from 0 to 3, and $R_2$ is a divalent moiety selected from the group consisting of arylene from 6 to 12 carbon atoms, inclusive,

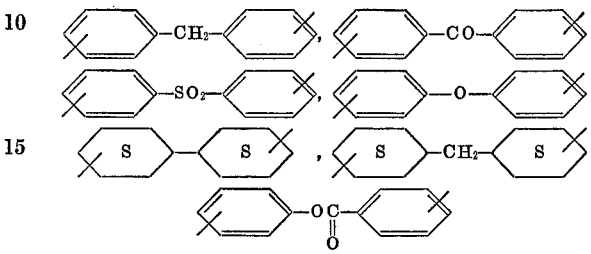

and

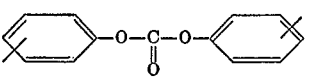

2. A polybenzimidazole according to claim 1 wherein the recurring unit has the structure:

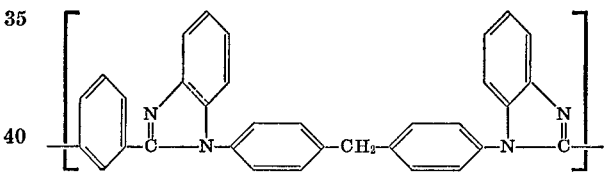

3. A polybenzimidazole according to claim 1 wherein the recurring unit has the structure:

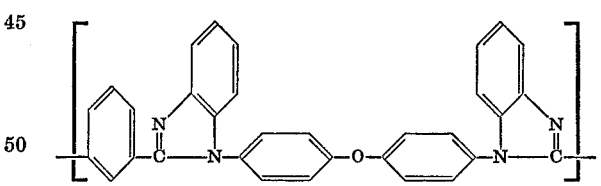

4. A polybenzimidazole according to claim 1 wherein the recurring unit has the structure:

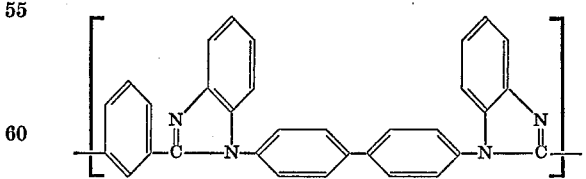

References Cited
UNITED STATES PATENTS 3,174,947  3/1965  Marvel et al.
3,509,108  4/1970  Prince.
3,630,972  12/1971  Marvel et al.
3,655,632  4/1972  Ohfuji et al.

MELVIN GOLDSTEIN, Primary Examiner

U.S. Cl. X.R.

260—47 R, 47 X, 47 C, 49, 63 R, 65, 79.3 M, 570 R, 570 AB, 571, 576